United States Patent
Joshi et al.

(10) Patent No.: US 8,898,342 B2
(45) Date of Patent: Nov. 25, 2014

(54) METHODS AND STRUCTURE ENHANCING ZONE CONFIGURATION IN A SERIAL ATTACHED SCSI ENVIRONMENT

(75) Inventors: Mandar Joshi, Pune (IN); Saurabh B. Khanvilkar, Thane (IN); Kaushalender Aggarwal, Faridabad (IN)

(73) Assignee: LSI Corporation, Milpitas, CA (US)

( * ) Notice: Subject to any disclaimer, the term of this patent is extended or adjusted under 35 U.S.C. 154(b) by 300 days.

(21) Appl. No.: 13/546,715

(22) Filed: Jul. 11, 2012

(65) Prior Publication Data

US 2014/0019645 A1    Jan. 16, 2014

(51) Int. Cl.
G06F 3/00    (2006.01)
(52) U.S. Cl.
USPC .......................................................... 710/5
(58) Field of Classification Search
None
See application file for complete search history.

(56) References Cited

U.S. PATENT DOCUMENTS 7,958,282 B2 *    6/2011    Odenwald et al. .............. 710/42

OTHER PUBLICATIONS

Working Draft Project American National Standard, Revision 14e, Sep. 26, 2008, p. 478.*
Symons et al., "T10/06-019r5 SAS-2 zoning," Dec. 23, 2005, T10 Committee.

* cited by examiner

Primary Examiner — Henry Tsai
Assistant Examiner — Juanito Borromeo
(74) Attorney, Agent, or Firm — Duft Bornsen & Fettig LLP (57) ABSTRACT

Methods and structure are provided for enhancing zone configuration processes in a Serial Attached SCSI (SAS) architecture. The method includes embedding, at a SAS initiator, a ZONE UNLOCK request within a Serial Management Protocol (SMP) ZONE ACTIVATE command. The method also comprises transmitting the SMP ZONE ACTIVATE command to a SAS expander, and receiving, at the SAS expander, the SMP ZONE ACTIVATE command. Further, the method includes detecting, at the SAS expander, the ZONE UNLOCK request within the SMP ZONE ACTIVATE COMMAND. Additionally, the method includes copying, at the SAS expander, shadow SAS zoning data from a memory of the expander to current SAS zoning data at the memory of the expander responsive to acquiring the SMP ZONE ACTIVATE command. The method also comprises unlocking the SAS expander responsive to extracting the ZONE UNLOCK request from the SMP ZONE ACTIVATE command.

20 Claims, 5 Drawing Sheets

ZONE PHY INFORMATION TABLE (PARTIAL)

| PHY | ZONE GROUP |
|---|---|
| PHY 1 | ZONE 8 |
| PHY 2 | ZONE 9 |
| PHY 3 | ZONE 9 |
| PHY 4 | ZONE 9 |
| PHY 5 | ZONE 10 |
| PHY 6 | ZONE 10 |
| PHY 7 | ZONE 8 |
| PHY 8 | ZONE 8 |
| ... | ... |

ZONE PERMISSION TABLE (PARTIAL)

SOURCE ZONE GROUP →

DESTINATION ZONE GROUP ↓

| | ZONE 8 | ZONE 9 | ZONE 10 |
|---|---|---|---|
| ZONE 8 | GRANTED | DENIED | DENIED |
| ZONE 9 | GRANTED | GRANTED | GRANTED |
| ZONE 10 | DENIED | GRANTED | GRANTED |

METHODS AND STRUCTURE ENHANCING ZONE CONFIGURATION IN A SERIAL ATTACHED SCSI ENVIRONMENT

BACKGROUND

1. Field of the Invention

The invention relates generally to Serial Attached SCSI (SAS) and more specifically relates to methods of performing zone configuration in a SAS architecture.

2. Discussion of Related Art

In Serial Attached SCSI (SAS) architectures (e.g., storage systems, general purpose computers, etc.), various SAS initiators communicate with various SAS targets, typically through one or more SAS expanders. The SAS expanders use multiple PHYs (e.g., physical links accompanied by associated transceiver hardware and logic) to route Input/Output (I/O) requests between the initiators and the targets, creating a switched fabric by which an initiator may contact one or more different targets (and/or vice versa). An interconnected, switched SAS fabric is therefore highly desirable because it allows communications between various SAS devices to be performed quickly, yet does not require a dedicated wire line connection between each SAS initiator and each SAS target.

Routing functions and associated tables within a SAS expander determine how to route a frame received from a first SAS device and directed to a second SAS device. The routing functions and tables identify which PHY of the expander the frame should be forwarded to in order to direct the frame toward its intended destination device (e.g., a SAS target or initiator device coupled to the switched SAS fabric). Later developments of the SAS standards introduced a "zone permission" feature that allowed for the addition of security measures within the SAS system that allow or dis-allow connections between devices and/or between groups of devices. For example, in a large enterprise it may be desirable to allow SAS devices within an engineering department to access one another, while also restricting the devices in the engineering department from accessing devices in the finance department (and vice versa). In order to configure SAS expanders to properly route and authorize incoming and outgoing I/O requests to various targets and initiators, SAS expanders often utilize these SAS zoning features. According to SAS zoning standards, each PHY of the SAS expander is associated with a SAS zone group. For the zone groups, a zone permission table is used to define which source zone groups may initiate communications with which destination zone groups. Requests from devices coupled with a PHY in a first zone group to access devices coupled with PHYs in unauthorized zone groups are rejected by a (zoning capable) expander that receives such requests. This ensures that unauthorized access does not occur within the SAS architecture.

SAS devices that implement zone management logic (i.e., zone managers) are used in order to configure the zoning of SAS expanders. Such zone managers use Serial Management Protocol (SMP) commands to program a SAS expander to alter the zone group numbers of various PHYs. Zone managers may further alter zone permissions in order to adjust which zone groups of an expander may interact with which other zone groups.

Currently, the zone configuration process takes some time, as the zone manager proceeds to engage in four separate steps: lock, load, activate, and unlock. Each step is associated with an activity. The lock step ensures that only one zone manager manipulates the SAS expander at once, the load step changes zoning parameters in a shadow memory of the expander, the activate step copies the zoning parameters from shadow memory into current memory of the expander in order to implement the new zoning parameters for incoming requests, and the unlock step releases the SAS expander so that it may be manipulated by other devices.

Furthermore, each step of the zone configuration process is associated with one or more SMP commands. For example, the lock step is associated with the SMP ZONE LOCK request, the load step is associated with one or more of SMP CONFIGURE ZONE PHY INFORMATION and SMP CONFIGURE ZONE PERMISSION TABLE, the activate step is associated with SMP ZONE ACTIVATE, and the unlock step is associated with SMP UNLOCK.

Because there are a large number of commands to manage during the zone configuration process, it can be a fairly cumbersome affair. Furthermore, if a zone manager fails to adhere to each of the zone configuration steps, a SAS expander may generate an error, which can trigger error processing and recovery at the zone manager. For example, if a SAS initiator transmits an SMP UNLOCK before an SMP ZONE ACTIVATE command has finished processing, the zone manager may receive an error in response. This in turn may activate error processing and recovery systems, wasting available resources at the zone manager.

Thus it is an ongoing challenge to enhance the efficiency of the SAS zone configuration process.

SUMMARY

The present invention addresses the above and other problems, thereby advancing the state of the useful arts, by providing methods and structure for enhancing SAS zone configuration processes and systems. Specifically, the present invention embeds/integrates ZONE UNLOCK requests within SMP ZONE ACTIVATE commands generated by a SAS initiator. In this manner, a single SMP ZONE ACTIVATE command can be used to trigger both the activate phase as well as the unlock phase of the SAS configuration process. This in turn reduces processing load at the SAS initiator, freeing up resources and enhancing efficiency of the system.

In one aspect hereof, a method is provided for integrating ZONE UNLOCK requests into Serial Management Protocol (SMP) ACTIVATE commands The method comprises embedding, at a Serial Attached SCSI (SAS) initiator, a ZONE UNLOCK request within a SMP ZONE ACTIVATE command The method also comprises transmitting the SMP ZONE ACTIVATE command to a SAS expander via a PHY of the SAS initiator, and receiving, at the SAS expander, the SMP ZONE ACTIVATE command. Further, the method includes detecting, at the SAS expander, the ZONE UNLOCK request within the SMP ZONE ACTIVATE COMMAND. Additionally, the method includes copying, at the SAS expander, shadow SAS zoning data from a memory of the expander to current SAS zoning data at the memory of the expander responsive to acquiring the SMP ZONE ACTIVATE command. The method also comprises unlocking the SAS expander responsive to extracting the ZONE UNLOCK request from the SMP ZONE ACTIVATE command.

Another aspect hereof provides a Serial Attached SCSI (SAS) initiator. The SAS initiator comprises a controller and a PHY. The controller is operable to generate Serial Management Protocol (SMP) zone configuration commands for a SAS expander. The PHY is operable to transmit the generated zone configuration commands to the SAS expander. The controller is further operable to embed a ZONE UNLOCK request within an SMP ZONE ACTIVATE command, and to instruct the PHY to transmit the SMP ZONE ACTIVATE command that includes the embedded ZONE UNLOCK request in order to activate and unlock the SAS expander.

Another aspect hereof provides a Serial Attached SCSI (SAS) expander. The expander comprises multiple PHYs, a memory operable to store current SAS zoning data and shadow SAS zoning data for the PHYs, and a control unit operable to alter the shadow SAS zoning data based on received SMP zone configuration commands The control unit is further operable to acquire a Serial Management Protocol (SMP) ZONE ACTIVATE command, further operable to detect a ZONE UNLOCK request within the SMP ZONE ACTIVATE command, and is further operable to copy the shadow SAS zoning data to the current SAS zoning data responsive to acquiring the SMP ZONE ACTIVATE command. The control unit is further operable to unlock the SAS expander responsive to detecting the ZONE UNLOCK request within the SMP ZONE ACTIVATE command.

DETAILED DESCRIPTION OF THE DRAWINGS

Figure 1:
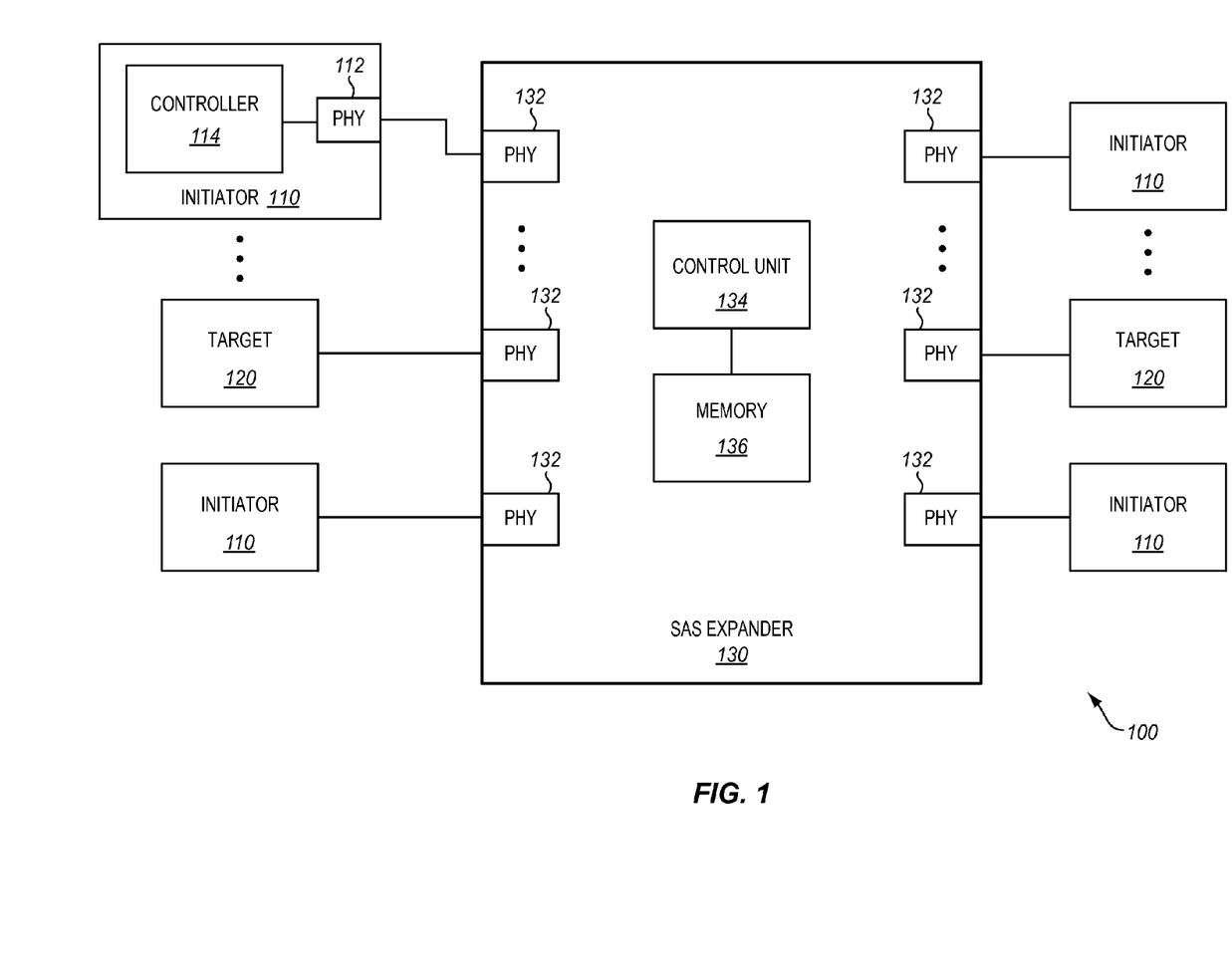
FIG. 1 is a block diagram of an exemplary SAS architecture in accordance with features and aspects hereof.

FIG. 1 is a block diagram of an exemplary SAS architecture 100 in accordance with features and aspects hereof SAS architecture 100 provides a benefit over prior systems because SAS architecture 100 is capable of integrating/embedding ZONE UNLOCK requests within SMP ZONE ACTIVATE requests. This saves initiators at SAS architecture 100 the wasted effort of waiting for a ZONE ACTIVATE to complete, and also saves the initiators the effort of generating two independent SMP commands (e.g., an SMP ZONE ACTIVATE command as well as an SMP ZONE UNLOCK request).

In this embodiment, SAS architecture 100 comprises one or more initiators 110 and targets 120 coupled with SAS expander 130. SAS initiators 110 comprise any number and combination of SAS devices that include SSP, STP, and/or SMP initiator devices. SAS initiators 110 may originate device-service and task-management requests for processing by a target device, and may also receive responses for the same requests from target devices. For example, SAS initiators 110 may comprise one or more Host Bus Adapters (HBA's) and/or on-board components of an electronic device, may implement zone management logic, etc. SAS targets 120 may contain logical units and target ports that receive device-service and task-management requests for processing, and SAS targets 120 may further send responses for the same requests to initiator devices. For example, SAS targets 120 may comprise any number and combination of SAS devices that include, for example, SSP, STP, and/or SMP target devices. SAS targets 120 may include, for example, storage controllers, storage devices (e.g., hard disks, disk array systems, etc.). Typically, one or more SAS expanders (e.g., SAS expander 130) will communicatively couple the various SAS initiators 110 and SAS targets 120.

In this embodiment, at least one initiator 110 includes PHY 112 as well as enhanced controller 114. PHY 112 comprises any SAS PHY operable to transmit Serial Management Protocol (SMP) data. Controller 114 is capable of generating SMP commands used for zone configuration, and has been enhanced to embed ZONE UNLOCK requests within SMP ZONE ACTIVATE commands. For example, controller 114 may add a tag or other indicator to one or more bit locations within an SMP ZONE ACTIVATE command, and this tag may indicate whether or not a ZONE UNLOCK should be performed in conjunction with the SMP ZONE ACTIVATE command (thereby obviating the need for a separate SMP ZONE UNLOCK command to be sent).

In a further example, a second tag is provided (in addition to the first tag), and the second tag indicates how the ZONE UNLOCK should be performed in conjunction with the SMP ZONE ACTIVATE command. For example, one setting for the second tag may indicate that a SAS expander should wait for the zone activation process to complete successfully before unlocking and/or sending an SMP response, while another setting for the second tag may indicate that the expander should start the zone activation process in the background and proceed with an unlock and/or an SMP response (i.e., without regard to whether the zone activation process has completed successfully). For purposes of illustration, the first tag could be located in one or more reserved sections (e.g., bits) of the SMP ZONE ACTIVATE command, such as within byte 6, bit 1 of the SMP ZONE ACTIVATE command. Similarly, the second tag could also be located in one or more reserved sections (e.g., bits) of the SMP ZONE ACTIVATE command, such as within byte 6, bit 0 of the SMP ZONE ACTIVATE command.

In one embodiment controller 114 may also generate SMP commands used for zone configuration of SAS expander 130. For example, controller 114 may generate commands for the lock step of zone configuration (e.g., SMP ZONE LOCK) and/or commands for the load step of zone configuration (e.g., SMP CONFIGURE ZONE PHY INFORMATION, SMP CONFIGURE ZONE PERMISSION TABLE, SMP ENABLE DISABLE ZONING, etc.).

In a further embodiment, the enhanced features of controller 114 may be enabled and/or disabled depending upon whether controller 114 detects that it is coupled with an enhanced SAS expander (e.g., SAS expander 130). The enhanced features may also be enabled and/or disabled depending upon programmed inputs provided to controller 114. When the enhanced features are disabled, controller 114 may generate standard commands for the activate step of zone configuration, (e.g., SMP ZONE ACTIVATE commands that do not include embedded ZONE UNLOCK requests), and standard commands for the unlock step of zone configuration (e.g., SMP ZONE UNLOCK requests that are not embedded within SMP ZONE ACTIVATE commands).

SAS architecture 100 may comprise any number and arrangement of SAS expanders that perform service delivery functions. In FIG. 1 however, only one SAS expander (SAS expander 130) is depicted. SAS expander 130 includes multiple PHYs 132 used to perform SAS routing. Such PHYs 132 may be organized into any number of zone groups based upon current zone PHY information stored in memory 136 of SAS expander 130. Current permission data for the zone groups is also stored in memory 136 in order to grant/deny access between various zone groups in accordance with SAS specifications. For example, the Serial Attached SCSI-2 (SAS-2) standards (revision 16), issued 18 Apr. 2009 by the T10 committee and herein incorporated by reference, may be utilized to define the default permissions of certain zone groups (e.g., zone groups 1-8).

As discussed above, memory 136 stores current SAS zoning data (e.g., zone permission tables, zone PHY information, etc.). Current SAS zoning data values are the values that are currently implemented and used by SAS expander 130 for routing. Memory 136 also stores shadow SAS zoning data (e.g., zone permission tables, zone PHY information, etc.). Shadow zoning data is distinguished from current zoning data in that shadow zoning data is not currently implemented, but may be implemented to replace the current zoning data at a later point in time. Memory 136 may comprise registers, Random Access Memory (RAM), nonvolatile memory, solid state memory, etc.

SAS expander 130 further includes control unit 134. Control unit 134 is operable to manage the operations of SAS expander 130, thereby enabling SAS expander 130 to perform routing for SAS architecture 100. Control unit 134 has been enhanced such that it may process SMP ZONE ACTIVATE commands that include embedded ZONE UNLOCK requests. This creates a substantial benefit because processing can continue at SAS expander 130 in order to complete the zone configuration process, without waiting for an additional independent SMP ZONE UNLOCK request.

In one embodiment, SAS expander 130 detects (e.g., reads/analyzes) one or more tags in the SMP ZONE ACTIVATE command indicating whether to perform a ZONE UNLOCK. Such tags are discussed above with respect to SAS initiator 110. During processing, SAS expander 130 may search for the tags in a predefined location within a received SMP ZONE ACTIVATE command, or may search for the tags based on a keyword or other pattern indicating their presence.

In circumstances wherein the tags are provided in the form of reserved bits within the SMP ZONE ACTIVATE COMMAND, SAS expander 130 may process one bit to determine whether to perform a ZONE UNLOCK at substantially the same time as the SMP ZONE ACTIVATE. If the bit indicates that the ZONE UNLOCK should not be performed substantially concurrently, then SAS expander 130 may proceed in a normal SMP zone configuration process as defined by the SAS specification. In such circumstances, SAS expander 130 waits to receive an SMP ZONE UNLOCK request before unlocking itself from the zone configuration process.

However, if the first bit indicates that the ZONE UNLOCK should be performed substantially concurrently with the SMP ZONE ACTIVATE command, then SAS expander 130 may process the second bit in order to determine whether the ZONE UNLOCK should be performed in conjunction with the SMP ZONE ACTIVATE command, or after successful completion of the zone activation process. If the ZONE UNLOCK awaits successful completion of the zone activation process, then SAS expander 130 may perform zoning operations such as copying zone data from shadow memory to current memory, performing a link reset, propagating SMP Zoned Broadcast or Broadcast Change messages to underlying expanders, etc., before the ZONE UNLOCK is performed. This can be a time consuming operation, but will ensure successful application of the new zoning information across SAS architecture 100. In either case of the second bit/indicator, the enhanced expander 130 will not await receipt of an SMP ZONE UNLOCK command as normally required by the SAS standards.

SAS expander 130 may further include appropriate logic to signal an error in processing if the SMP ZONE ACTIVATE and/or ZONE UNLOCK fails. For example, SAS expander 130 may send an error back to initiator 110 by transmitting an SMP response that indicates whether the failure occurred with respect to the SMP ZONE ACTIVATE, or whether the failure occurred with respect to the ZONE UNLOCK. Such an indicator could be placed, for example, within a reserved bit of the SMP response provided by SAS expander 130.

Note that the particular arrangement of components described herein is merely intended to be exemplary, and one of ordinary skill in the art will appreciate that the specific arrangement and configuration of SAS devices is merely a matter of design choice.

Figure 2:
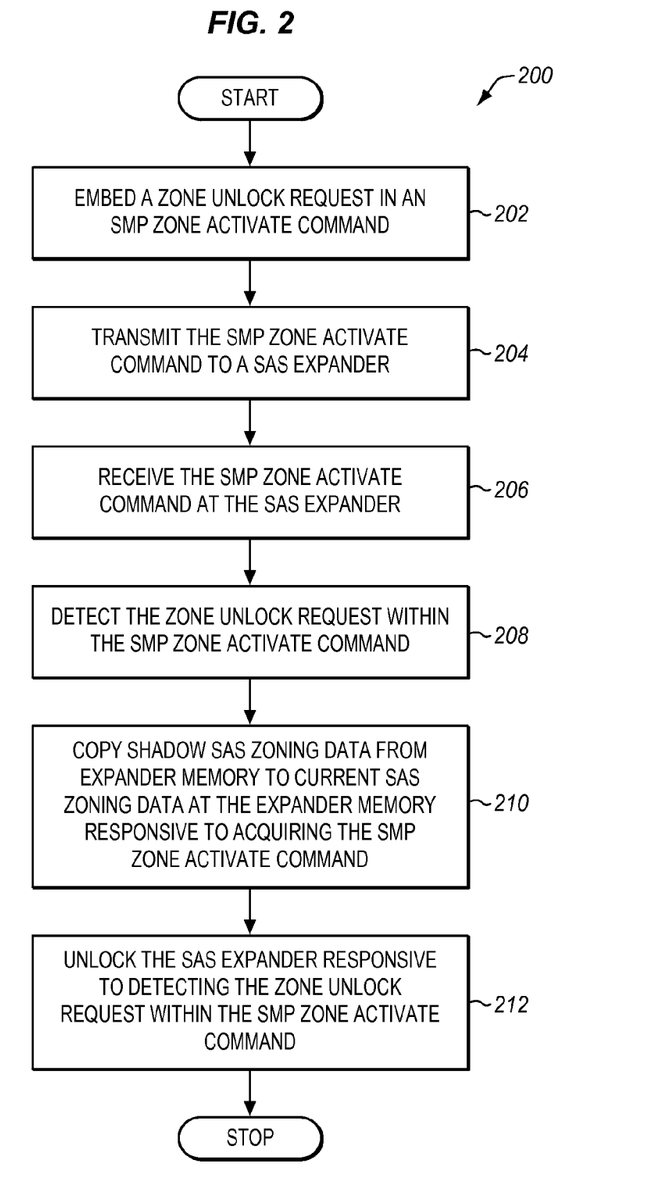
FIG. 2 is a flowchart describing an exemplary method in accordance with features and aspects hereof to embed ZONE UNLOCK requests within SMP ZONE ACTIVATE commands, and to process such SMP ZONE ACTIVATE commands.

FIG. 2 is a flowchart describing an exemplary method 200 in accordance with features and aspects hereof to embed ZONE UNLOCK requests within SMP ZONE ACTIVATE commands, and to process such SMP ZONE ACTIVATE commands The method of FIG. 2 may be operable in a SAS architecture such as described above with regard to FIG. 1.

Assume, for this embodiment, that a SAS initiator has contacted a SAS expander, has locked the SAS expander via an SMP ZONE LOCK request, and has loaded configuration data into the shadow memory of the SAS expander (e.g., via commands such as SMP CONFIGURE ZONE PHY INFORMATION, SMP CONFIGURE ZONE PERMISSION TABLE, etc.). This data, loaded into the shadow memory of the SAS expander, has not yet been actively implemented at the SAS expander, but remains ready to be applied to current memory of the expander in order to change the expander's configuration. In short, the shadow memory of the SAS expander is ready to be activated, but has not yet been activated to change how the SAS expander routes incoming requests. In order to implement the new configuration (which is loaded in the shadow memory of the SAS expander), the SAS initiator generates an SMP ZONE ACTIVATE command.

In step 202, the SAS initiator embeds a ZONE UNLOCK request in the SMP ZONE ACTIVATE command. This process may occur in a similar fashion to that described above with regard to SAS initiator 110 of FIG. 1. For example, the request may be stored as tag information within one or more reserved bits of the SMP ZONE ACTIVATE command.

In step 204, the SAS initiator transmits the SMP ZONE ACTIVATE command to the SAS expander. The transmission process occurs when a PHY of the SAS initiator transmits a command (e.g., via a switched SAS fabric) to a PHY of the SAS expander. In step 206, the SAS expander receives the SMP ZONE ACTIVATE command (i.e., the command is received at a PHY of the SAS expander).

In step 208, the SAS expander detects the ZONE UNLOCK request within the SMP ZONE ACTIVATE. This detection may occur, for example, by processing the SMP ZONE ACTIVATE to search for tags within the SMP data indicating whether a ZONE UNLOCK is also requested. These tags may comprise, for example, reserved bits or other portions of data. In one embodiment, there may be multiple tags that together indicate whether a ZONE UNLOCK should be performed, and if so, whether the SMP ZONE UNLOCK should be performed during or after the SMP ZONE ACTIVATE.

In step 210, the SAS expander copies the shadow SAS zoning data values to the current SAS zoning data values (e.g., the shadow values replace the current values). This occurs responsive to acquiring the SMP ZONE ACTIVATE command, and this processing serves to apply the new zoning data to the SAS expander.

In step 212, the SAS expander unlocks itself responsive to detecting the ZONE UNLOCK request within the SMP ZONE ACTIVATE command. Note that this process occurs without a need for receiving a separate SMP ZONE UNLOCK request from the SAS initiator. Thus, the process reduces load on the SAS architecture (by reducing the number of commands passed along the SAS architecture) and also speeds up the zone configuration process at the SAS expander (because the last two steps of configuration at the SAS expander may be performed without awaiting new commands from the SAS initiator).

Figure 3:
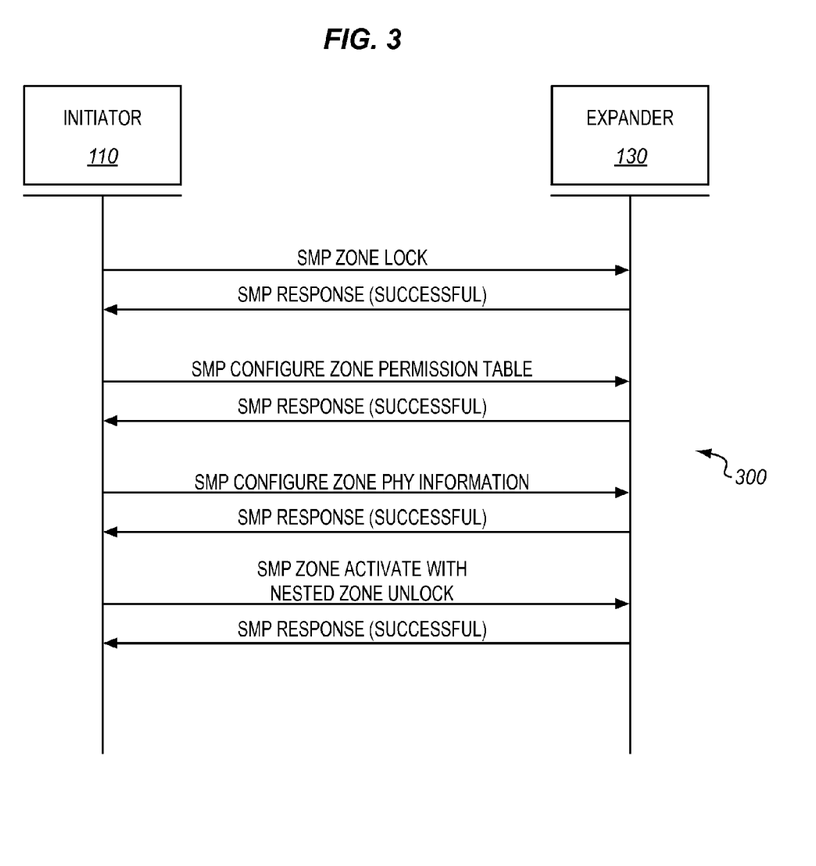
FIG. 3 is a message diagram illustrating an exemplary method in accordance with features and aspects hereof to perform SAS zone configuration.

FIG. 3 is a message diagram illustrating an exemplary method in accordance with features and aspects hereof to perform SAS zone configuration. According to FIG. 3, SAS initiator 110 of FIG. 1 initiates the process by transmitting an SMP ZONE LOCK command to SAS expander 130 of FIG. 1. If SAS expander 130 is currently unlocked, then SAS expander 130 may place itself into a locked state so that SAS initiator 110 can alter the configuration of SAS expander 130 without interference from other devices. If the lock is successful at SAS expander 130, then SAS expander 130 may respond with an SMP response to SAS initiator 110 indicating success. Next, SAS initiator 110 transmits an SMP CONFIGURE ZONE PERMISSION TABLE command and/or an SMP CONFIGURE ZONE PHY INFORMATION command to alter the shadow memory of SAS expander 130. Zone PHY information indicates the zone group that each PHY is associated with, as well as other characteristics as defined by the SAS standards (e.g., whether the zone group of the PHY is persistent, whether the PHY is within a Zoned Portion of a Service Delivery Subsystem (ZPSDS), etc.). In contrast, zone permission tables indicate which zone groups may access which other zone groups. In accordance with SAS standards, zone permissions need not be symmetric (e.g., a first zone may be able to access a second zone of PHYs, and yet remain inaccessible by the second group of PHYs). If the configuration data is successfully loaded into shadow memory, SAS expander 130 provides an SMP response to SAS initiator 110 for each received command, indicating that the command was successfully processed.

Next, SAS initiator 110 transmits an SMP ZONE ACTIVATE command to SAS expander 130. The SMP ZONE ACTIVATE includes an embedded ZONE UNLOCK request. SAS expander 130 processes the SMP ZONE ACTIVATE to load the shadow configuration values into current memory (thereby reprogramming its zoning configuration for incoming requests) and unlocks itself SAS expander 130 then proceeds to transmit an SMP response to SAS initiator 110 indicating the successful completion of these processes. Thus, the need for a separate SMP ZONE UNLOCK request from SAS initiator 110 (and accompanying SMP response from SAS expander 130) is eliminated.

Figure 4:
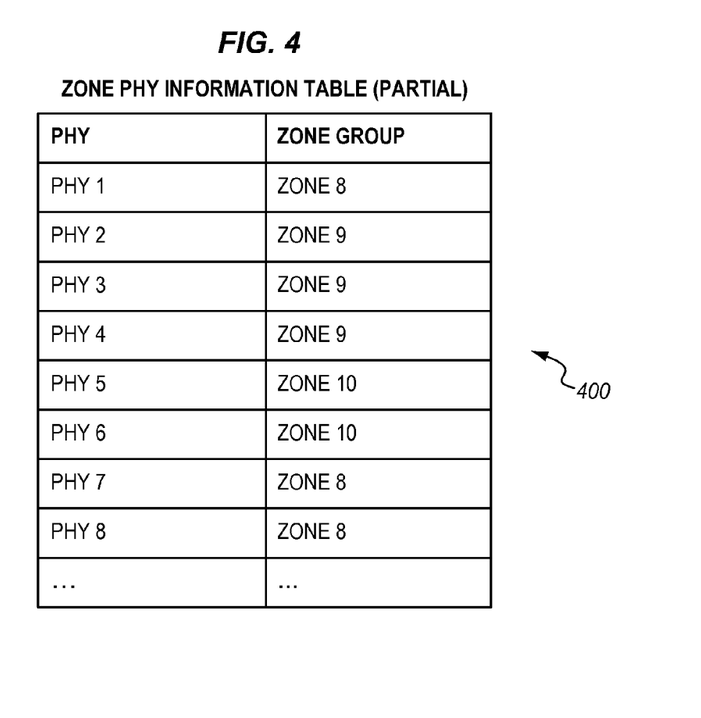
FIG. 4 is a block diagram illustrating an exemplary portion of zone PHY information stored in a memory of a SAS expander in accordance with features and aspects hereof.

FIG. 4 is a block diagram 400 illustrating an exemplary portion of zone PHY information stored in a memory of a SAS expander in accordance with features and aspects hereof According to FIG. 4, each PHY of a SAS expander is associated with a zone group. Any number of PHYs may be configured into any number of zone groups, although SAS expanders will often support 256 different zone groups.

Figure 5:
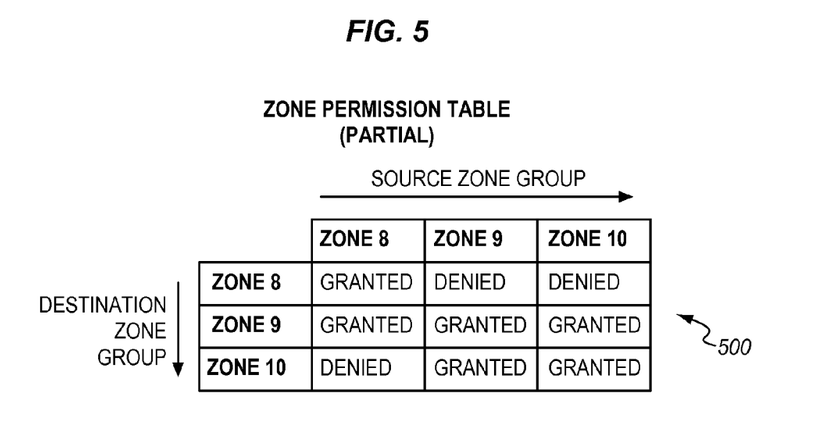
FIG. 5 is a block diagram illustrating an exemplary portion of a SAS zone permission table stored in a memory of a SAS expander in accordance with features and aspects hereof.

FIG. 5 is a block diagram 500 illustrating an exemplary portion of a SAS zone permission table stored in a memory of a SAS expander in accordance with features and aspects hereof Block diagram 500 illustrates how different source zone groups of PHYs may access different destination zone groups of PHYs. For example, according to FIG. 5, PHYs within zone group 8 may access other PHYs in zone groups 8 and 9, but not zone group 10. In contrast, PHYs within zone group 9 may access zones groups 9 and 10, but not zone group 8. Various SAS initiators (operating as zone managers) may be used to reprogram and alter such zone permission table data.

Figure 6:
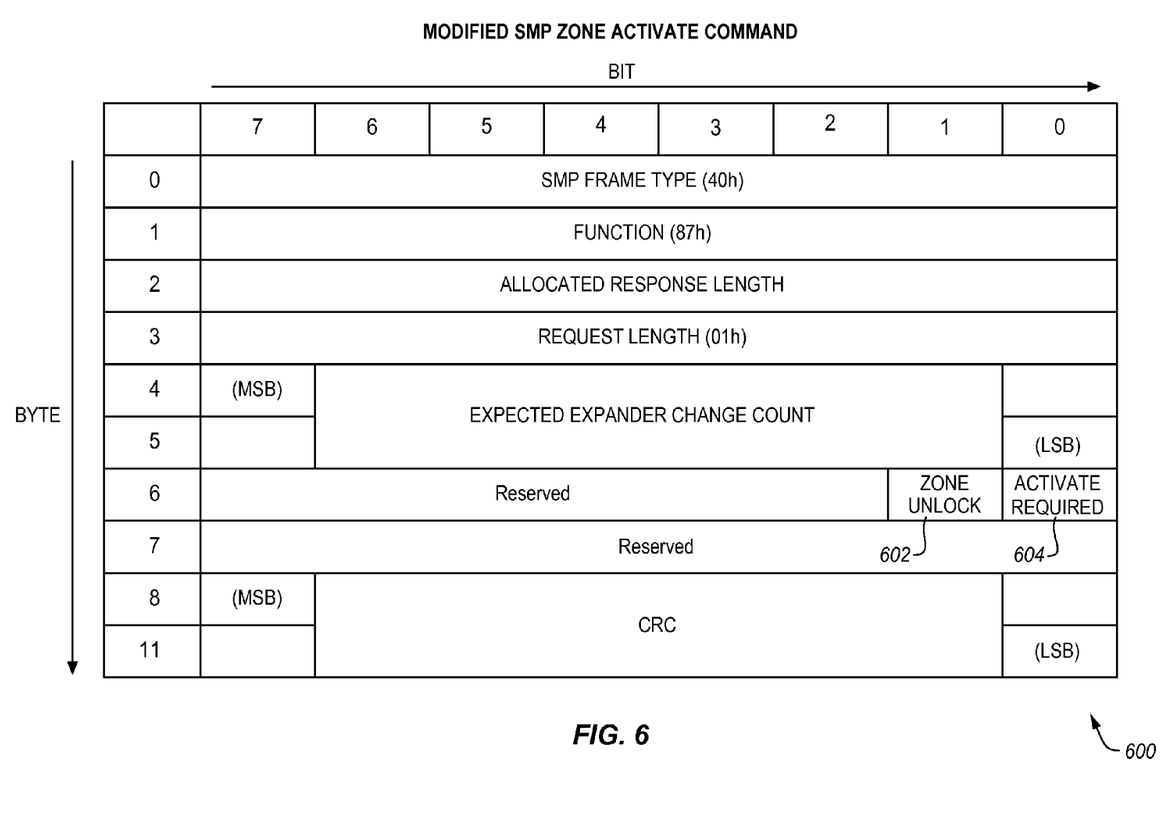
FIG. 6 is a block diagram illustrating an exemplary modified SMP ZONE ACTIVATE command in accordance with features and aspects hereof.

FIG. 6 is a block diagram illustrating an exemplary modified SMP ZONE ACTIVATE command 600 in accordance with features and aspects hereof According to FIG. 6, the SMP ZONE ACTIVATE command includes a custom portion that includes tag information. The tag information indicates whether a ZONE UNLOCK is also requested in conjunction with the SMP ZONE ACTIVATE command. According to FIG. 6, reserved bits have been used to indicate this tag information. For example, zone unlock tag 602 indicates whether or not a ZONE UNLOCK is also requested, while "activate required" tag 604 indicates whether the ZONE UNLOCK should be processed during or after the SMP ZONE ACTIVATE command. In this embodiment, zone unlock tag 602 is located in a reserved bit located at byte 6, bit 1 of the SMP ZONE ACTIVATE command, while activate required tag 604 is located at byte 6, bit 0 of the SMP ZONE ACTIVCATE command.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) initiator comprising:
 a controller operable to generate Serial Management Protocol (SMP) zone configuration commands for a SAS expander; and
 a PHY operable to transmit the generated zone configuration commands to the expander,
 the controller further operable to embed a ZONE UNLOCK request within an SMP ZONE ACTIVATE command, wherein the SMP ZONE ACTIVATE command directs the expander to copy, at the expander, shadow SAS zoning data from a memory of the expander to current SAS zoning data at the memory of the expander,
 wherein the controller is further operable to instruct the PHY to transmit the SMP ZONE ACTIVATE command that includes the embedded ZONE UNLOCK request in order to activate and unlock the SAS expander.

2. The SAS initiator of claim 1, wherein:
 the controller is further operable to embed the ZONE UNLOCK request within the SMP ZONE ACTIVATE command by altering a tag within the SMP ZONE ACTIVATE command, the tag indicating whether or not a ZONE UNLOCK request should be performed along with the SMP ZONE ACTIVATE.

3. The SAS initiator of claim 2, wherein:
 the tag altered by the controller is a reserved bit.

4. The SAS initiator of claim 3, wherein the reserved bit altered by the controller is located at byte 6, bit 1 of the SMP ZONE ACTIVATE command.

5. The SAS initiator of claim 2, wherein:
the controller is further operable to embed the ZONE UNLOCK request within the SMP ZONE ACTIVATE command by altering an additional tag in the SMP ZONE ACTIVATE command, the additional tag indicating whether the ZONE UNLOCK request should be performed before or after the SMP ZONE ACTIVATE command completes.

6. The SAS initiator of claim 5, wherein:
the additional tag altered by the controller is a reserved bit.

7. The SAS initiator of claim 6, wherein:
the reserved bit altered by the controller is located at byte 6, bit 0 of the SMP ZONE ACTIVATE command.

8. A Serial Attached SCSI (SAS) expander comprising:
multiple PHYs;
a memory operable to store current SAS zoning data and shadow SAS zoning data for the PHYs; and
a control unit operable to alter the shadow SAS zoning data based on received SMP zone configuration commands,
the control unit further operable to acquire a Serial Management Protocol (SMP) ZONE ACTIVATE command, further operable to detect a ZONE UNLOCK request within the SMP ZONE ACTIVATE command, further operable to copy, at the expander, the shadow SAS zoning data from the memory of the expander to the current SAS zoning data at the memory of the expander responsive to acquiring the SMP ZONE ACTIVATE command, and further operable to unlock the SAS expander responsive to detecting the ZONE UNLOCK request within the SMP ZONE ACTIVATE command.

9. The SAS expander of claim 8, wherein:
the control unit is further operable to detect the ZONE UNLOCK request within the SMP ZONE ACTIVATE command by analyzing a tag within the SMP ZONE ACTIVATE command, the tag indicating whether or not a ZONE UNLOCK request should be performed along with the SMP ZONE ACTIVATE.

10. The SAS expander of claim 9, wherein:
the tag analyzed by the control unit is a reserved bit.

11. The SAS expander of claim 10, wherein the reserved bit analyzed by the control unit is located at byte 6, bit 1 of the SMP ZONE ACTIVATE command.

12. The SAS expander of claim 9, wherein:
the control unit is further operable to detect the ZONE UNLOCK request within the SMP ZONE ACTIVATE command by analyzing an additional tag in the SMP ZONE ACTIVATE command, the additional tag indicating whether the ZONE UNLOCK request should be performed before or after the SMP ZONE ACTIVATE command completes.

13. The SAS initiator of claim 5, wherein:
the additional tag analyzed by the control unit is a reserved bit.

14. The SAS initiator of claim 6, wherein:
the reserved bit analyzed by the control unit is located at byte 6, bit 0 of the SMP ZONE ACTIVATE command.

15. A method comprising:
embedding, at a Serial Attached SCSI (SAS) initiator, a ZONE UNLOCK request within a Serial Management Protocol (SMP) ZONE ACTIVATE command;
transmitting the SMP ZONE ACTIVATE command to a SAS expander via a PHY of the SAS initiator;
receiving, at the SAS expander, the SMP ZONE ACTIVATE command;
detecting, at the SAS expander, the ZONE UNLOCK request within the SMP ZONE ACTIVATE COMMAND;
copying, at the SAS expander, shadow SAS zoning data from a memory of the expander to current SAS zoning data at the memory of the expander responsive to acquiring the SMP ZONE ACTIVATE command; and
unlocking the SAS expander responsive to detecting the ZONE UNLOCK request within the SMP ZONE ACTIVATE command.

16. The method of claim 15, wherein embedding the ZONE UNLOCK request within the SMP ZONE ACTIVATE command comprises:
altering a tag within the SMP ZONE ACTIVATE command, the tag indicating whether or not a ZONE UNLOCK request should be performed along with the SMP ZONE ACTIVATE.

17. The method of claim 16, wherein:
the tag is a reserved bit.

18. The method of claim 17, wherein the reserved bit is located at byte 6, bit 1 of the SMP ZONE ACTIVATE command.

19. The method of claim 16, wherein embedding the ZONE UNLOCK request within the SMP ZONE ACTIVATE command comprises altering an additional tag in the SMP ZONE ACTIVATE command, the additional tag indicating whether the ZONE UNLOCK request should be performed before or after the SMP ZONE ACTIVATE command completes.

20. The method of claim 19, wherein:
the additional tag is a reserved bit.

* * * * *